United States Patent [19]

Noguchi

[11] 4,122,353

[45] Oct. 24, 1978

[54] BONNET STRUCTURE FOR GENERATOR

[75] Inventor: Tetsuo Noguchi, Oyama, Japan

[73] Assignee: Kabushiki Kaisha Komatsu Seisakusho, Tokyo, Japan

[21] Appl. No.: 769,103

[22] Filed: Feb. 16, 1977

[30] Foreign Application Priority Data

| | | | |
|---|---|---|---|
| Feb. 25, 1976 | [JP] | Japan | 51/20411[U] |
| Feb. 25, 1976 | [JP] | Japan | 51/20412[U] |
| Feb. 25, 1976 | [JP] | Japan | 51/20413[U] |
| Feb. 25, 1976 | [JP] | Japan | 51/20414[U] |

[51] Int. Cl.$^2$ .......... H02P 9/04

[52] U.S. Cl. .......... 290/1 A; 181/204

[58] Field of Search .......... 290/1 A, 1 R; 181/202, 181/204, 221, 244, 259, 205; 123/195 C

[56] References Cited

U.S. PATENT DOCUMENTS

| | | | |
|---|---|---|---|
| 2,086,036 | 7/1937 | Juergens | 290/1 A |
| 2,241,768 | 4/1941 | Deremer | 181/244 |
| 3,856,439 | 12/1974 | Moehrback | 181/204 |
| 3,897,850 | 8/1975 | Thompson et al. | 181/204 |

FOREIGN PATENT DOCUMENTS

| | | | |
|---|---|---|---|
| 396,478 | 1/1922 | Fed. Rep. of Germany | 46/5 |

*Primary Examiner*—Robert K. Schaefer
*Assistant Examiner*—Michael K. Mutter
*Attorney, Agent, or Firm*—Armstrong, Nikaido, Marmelstein & Kubovcik

[57] ABSTRACT

A bonnet structure for generator comprising a main wall enclosing the generator and an engine for driving the generator, a partition wall for dividing the bonnet into two chambers, each chamber containing the engine and the generator, respectively, and the cover wall provided on said main wall wherein a rotor-fan of the generator is positioned within the chamber containing the engine.

4 Claims, 5 Drawing Figures

BONNET STRUCTURE FOR GENERATOR

BACKGROUND OF THE INVENTION

This invention relates to a bonnet structure for use in sound-proof generators.

There has heretofore been known a sound-proof generator in which a cooling air intake is provided on one side of its bonnet, a generator and an engine for driving it are accommodated in the same chamber, and a radiator is fitted to its partition wall.

In the generator of such type, cooling air is introduced in it by rotating the generator's rotor-fan and the engine's fan so as to allow the cooling air to flow through the inside and outside of the generator and the outside of the engine and discharge the air warmed thereby through the radiator outside the engine.

Because of the engine and the generator being accommodated in the same chamber without a partition wall therebetween, such type of structure requires provision of a large area or space in which sound absorption material is installed. Further, passage of exhaust air from the generator kept at a comparatively high temperature through the radiator requires provision of a radiator having a large capacity.

In the above-mentioned bonnet structure, the inside and outside of the generator are cooled by cooling air; however, as a matter of fact, there is no need of cooling both the inside and outside of the generator, because the quantity of heat generated by the generator is limited or low.

SUMMARY OF THE INVENTION

It is, therefore, an object of the present invention to provide a bonnet structure for a generator wherein an area to which sound absorption material is affixed can be minimized.

Another object of the present invention is to provide a bonnet structure for a generator wherein a compact type radiator can be employed.

It is still another object of the present invention to provide a bonnet structure for a generator wherein provision of a duct for a rotor-fan or an electrically driven fan can be eliminated thereby reducing the cost of the generator assembly.

It is a further object of the present invention to provide a bonnet structure for generator wherein deterioration in performance and durability due to wetting of sound absorption material can be eliminated by preventing entry of rain into inside of the bonnet.

It is a still further object of the present invention to provide a bonnet structure for generator having a guide means for supplying water into the radiator wherein water can be supplied to the radiator without causing any scattering of supplying water.

It is a still further object of the present invention to provide a bonnet structure for generator having a detachable sound absorption duct mounted in front of the radiator.

According to the present invention, there is provided a bonnet structure for generator including an engine for driving the generator, a radiator having guide means for supplying water therein, and a muffler having an exhaust nozzle means mounted thereon, said generator having a rotor-fan for air intake wherein said bonnet structure, comprises a main wall for accommodating the engine and the generator, said main wall having a first air intake means for cooling the engine, a second air intake means for cooling the generator and an outlet means, a partition wall provided within said main wall so as to form first and second chambers, each chamber accommodating the engine and the generator, respectively, the rotor-fan of said generator being located within said first chamber accommodating the engine, and a cover wall for covering said muffler.

Other objects, features and advantages of the present invention will be readily apparent from the following description taken in conjunction with the following drawings.

DETAILED DESCRIPTION OF THE PREFERRED EMBODIMENTS

Figure 1:
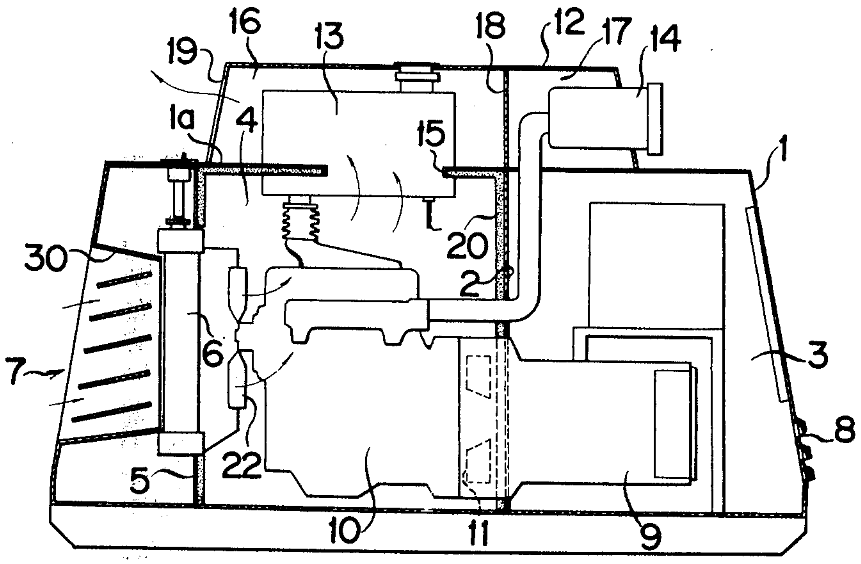
FIG. 1 is a longitudinal cross-sectional view of the bonnet structure according to the present invention.

In the drawings, reference numeral 1 denotes a bonnet body having a partition wall 2 which divides the inside of the bonnet body into a chamber 3 for accommodating a generator and a chamber 4 for accommodating an engine. The chamber 4 in which an engine is mounted has an wall plate 5 to which is fitted a radiator 6.

The bonnet body 1 has a cooling air intake 7 formed in front of the radiator 6. The chamber 3 has a cooling air intake 8 formed on the side thereof. Accommodated within the chamber 3 is a generator 9 and also located within the chamber 4 is an engine 10. Further, mounted within the chamber 4 is a rotor-fan 11 connected to the generator 9.

Installed on the upper part of the bonnet body 1 is a bonnet cover 12 in which are mounted a muffler 13 and an air cleaner 14. The bonnet body 1 has a hole 15 formed in the upper part 1*a* thereof, which permits communication between the engine accommodating chamber 4 and a muffler accommodating chamber 16 defined within the bonnet cover 12.

Further, the inside of the bonnet cover 12 is divided by a partition wall 18 into the muffler accommodating chamber 16 and an air cleaner accommodating chamber 17. The chamber 16 has an air outlet 19 formed therein. Further, the engine accommodating chamber 4 has a sound absorption plate 2 secured to the inside thereof.

Thus, when a cooling fan 22 of the engine is rotated, cooling air will flow through a sound absorption duct 30 to cool the radiator 6 and the engine 10, and through the hole 15 and the muffler accommodating chamber 16 and is discharged out through the outlet 19.

On the other hand, the cooling air for the generator 9 is introduced through the air intake 8 into the generator accommodating chamber 3 by the rotation of the rotor-fan 11 and flows through the inside of the generator 9 and the rotor fan 11 into the engine accommodating chamber 4 where it joins the engine cooling air. Therefore, because the rotor-fan 11 which is a source of generating noise in the generator is located in the engine accommodating chamber 4, it becomes unnecessary to secure or apply sound absorption material to the inside of the generator accommodating chamber 3 which results in a decrease in the area in which the sound absorption plate is installed. Further, since the air kept at a considerably high temperature which has passed through the inside of the generator 9 is not permitted to flow through the radiator 6, it becomes possible to reduce the capacity of the radiator 6.

Figure 2:
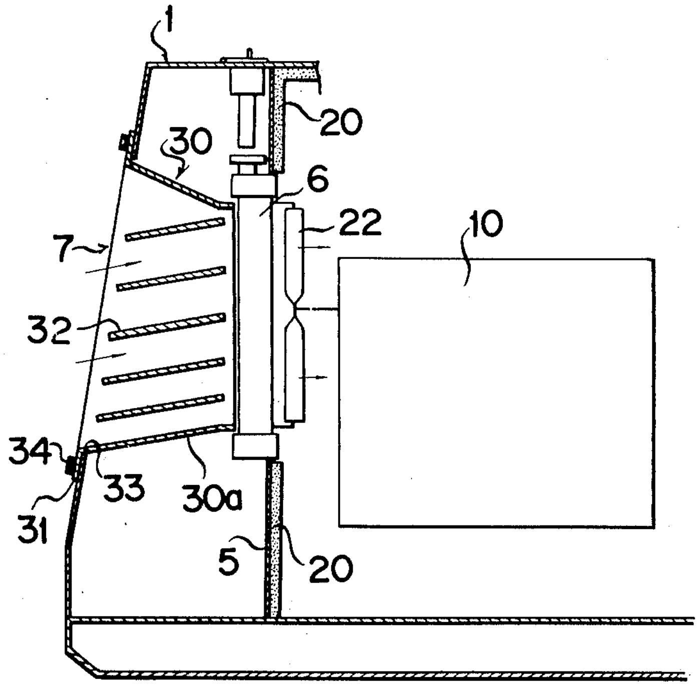
FIG. 2 is an enlarged longitudinal cross-sectional view of the air intake means for cooling the engine according to the present invention.

Referring to FIG. 2, there is provided a sound absorption duct 30 comprising a duct body 30*a* which has a seat 31 formed in the outer peripheral part thereof, in which seat in mounted the sound absorption duct 30. The inner opening of the sound absorption duct 30 has an area equal to that of core part of the radiator 6. A plurality of sound absorption plates 32 are fixedly secured within the sound absorption duct 30 at predetermined space intervals therebetween.

The sound absorption duct 30 is inserted through a hole 33 for mounting into the bonnet body 1 and is fixedly secured at the seat 31 to the bonnet body 1 by using bolts 34. Reference numeral 20 denotes a sound absorption material. Thus, in the case where the sound absorption plates 32 are damaged by rainwater or the time of periodical replacement is reached, the bolts 34 are removed, and then the sound absorption duct 30 is dismantled from the mounting hole 33 and is replaced with new one.

Figure 3:
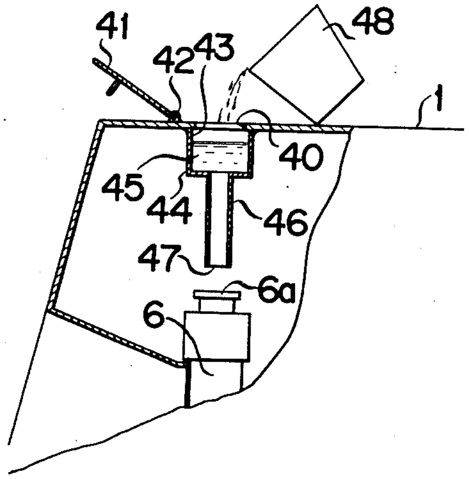
FIG. 3 is an enlarged longitudinal cross-sectional view of the guide means for supplying water into the radiator according to the present invention.
Figure 5:
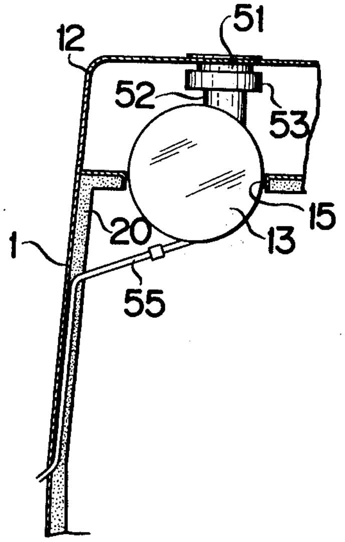
FIG. 5 is a view as seen from the direction of the arrow V in FIG. 4.

Referring to FIG. 3, reference numeral 1 denotes a bonnet, and 6 a radiator. The bonnet 1 has an water inlet part 40 formed in the upper surface part thereof. The upper surface part of the bonnet 1 has a cover plate 41 mounted thereto through a hinge 42 which is adapted to open and close the water inlet part 40.

Fixedly secured to the upper surface part of the bonnet 1 is a guide member 44 having an upper opening 43 which is registered with the water inlet part 40. The guide member 44 consists of an upper water reservoir 45 and a guide tube 46 connected to the lower part thereof. Further, the guide tube 46 has a lower opening 47 formed in the lower end thereof which is located just above and in proximity of an water inlet part 6*a* of the radiator 6.

Thus, when it is necessary to replenish the radiator 6 with water, the cover plate 41 raised up to open the water inlet part 40 and pour the water in a bucket 48 through the water inlet-part 40 into the reservoir 45 of the guide member 44. The water then flows through the guide cylinder 46 down into the water inlet part 6*a* of the radiator.

Figure 4:
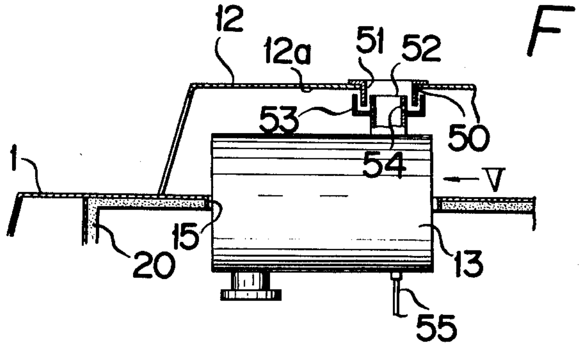
FIG. 4 is an enlarged longitudinal cross-sectional view of the exhaust nozzle means according to the present invention.

In FIG. 4, reference numeral 1 denotes a bonnet body in which are accommodated the engine, radiator and the generator etc. A bonnet cover 12 is fixedly secured to the upper surface of the bonnet body 1. Formed in the upper part of the bonnet body 1 is a hole 15 through which and inside the bonnet cover 12 is located a muffler 13.

Formed in the upper part 12*a* of the bonnet cover 12 is a hole 50 in which a guide cylinder 51 is mounted. The muffler 13 has an upper exhaust pipe 52 which has a saucer 53 fixedly secured to the upper peripheral part thereof. The lower end of the guide cylinder 51 is inserted into the saucer 53.

The exhaust pipe 52 has a hole 54 formed therethrough, and the inside of the saucer 53 communicates through the through-hole 54 with the inside of the exhaust pipe 52. A drain pipe 55 is connected to the bottom of the muffler 13 and extends outside the bonnet body 1.

The inner surfaces of the bonnet body 1 and the bonnet cover 12 are fitted with sound absorption material 20. Thus, rainwater flows partly and directly into the muffler 13, and it flows partly through the guide cylinder 51 into the saucer 53 and then flows through the through-hole 54 and the exhaust pipe 52 into the muffler 13. The rainwater flowed into the muffler 13 is discharged through the drain pipe 55 outside the bonnet body 1.

It is to be understood that the foregoing desctiption is merely illustrative of the preferred embodiments of the invention and that the scope of the invention is not to be limited thereto, but is to be determined by the scope of the appended claims.

What is claimed is:

1. A bonnet structure for a generator including an engine for driving the generator, a radiator having guide means for supplying water therein, and a muffler having an exhaust nozzle means mounted thereon, said generator having a rotor-fan for air intake wherein said bonnet structure comprises a main wall for enclosing the engine and the generator, said main wall having a first air intake means for cooling the engine, a second air intake means for cooling the generator and an outlet means, a partition wall provided within said main wall so as to define first and second chambers, said first chamber enclosing the engine and said second chamber enclosing the generator, the rotor-fan of said generator being located within said first chamber enclosing the engine, a sound absorption plate means covering the entire inner walls of said first chamber and a cover wall for covering said muffler wherein cooling air introduced through said second air intake means flows inside of said second chamber before it joins cooling air introduced through said first air intake means.

2. A bonnet structure for generator of claim 1 wherein said first air intake means comprises a duct wall extending from said main wall to said radiator, and a plurality of sound absorption plates arranged in a spaced relationship within said duct wall, said duct wall with said plates being adapted to be detachable from said main wall.

3. A bonnet structure for generator of claim 1 wherein said guide means for supplying water into said radiator comprises a water reservoir fixedly secured to said main wall, and a guide cylinder attached to said water reservoir, the leading end of said guide cylinder being positioned in a spaced relationship with an inlet of said radiator.

4. A bonnet structure for generator of claim 1 wherein said exhaust nozzle means of the muffler comprises a guide cylinder fixedly secured to said cover wall, an exhaust pipe fixedly secured to said muffler, a saucer fixedly secured to said exhaust pipe, said exhaust pipe having a hole formed therein forming a passage between the inside of said saucer and the inside of said exhaust pipe and a drain pipe extends between the inside of said muffler and the outside of the bonnet.

* * * * *